April 14, 1970   J. L. WHERRY   3,505,815
TRAILER HITCH WITH TRAILER BRAKE ACTUATOR
Filed Feb. 15, 1968   3 Sheets-Sheet 1
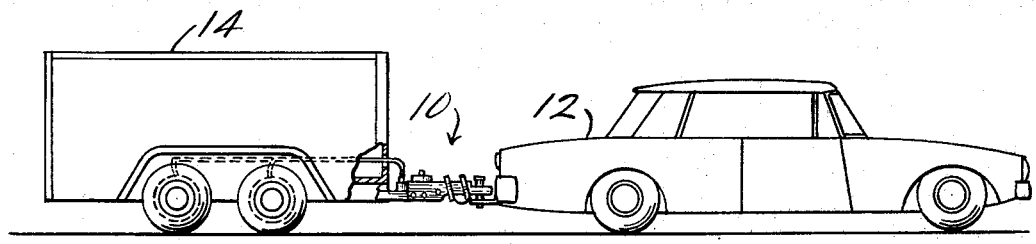
FIG-1-
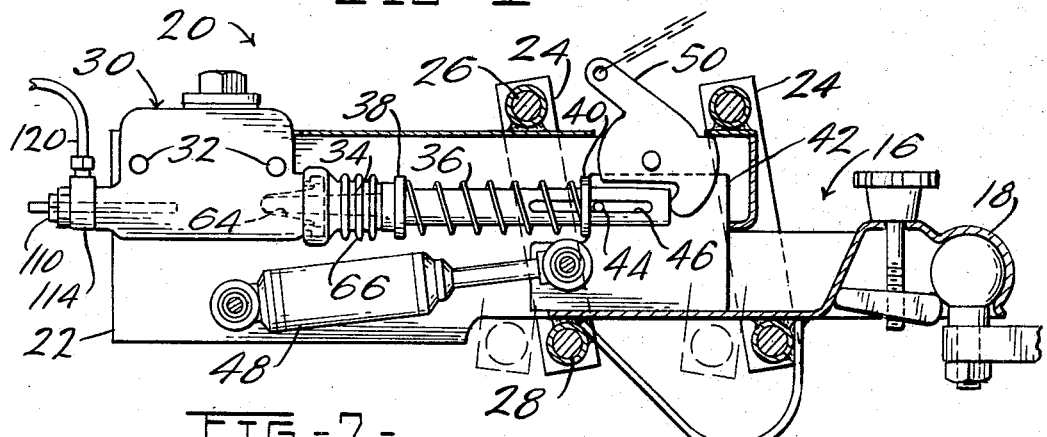
FIG-2-
FIG-3-
INVENTOR:
JOSEPH L. WHERRY
BY
ATT'YS.

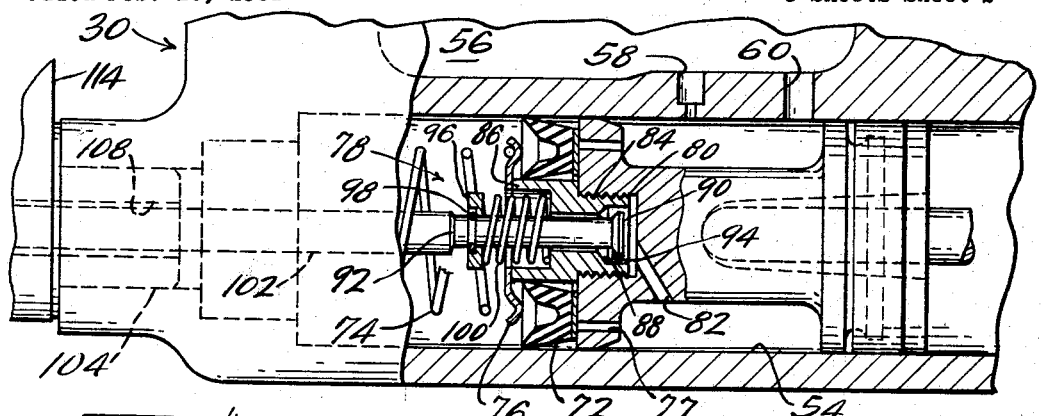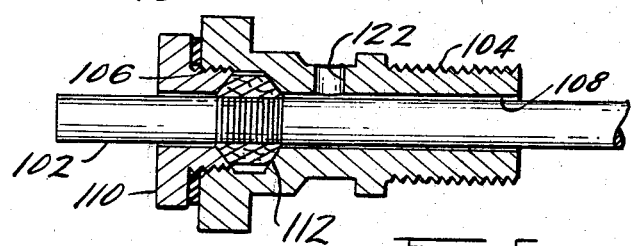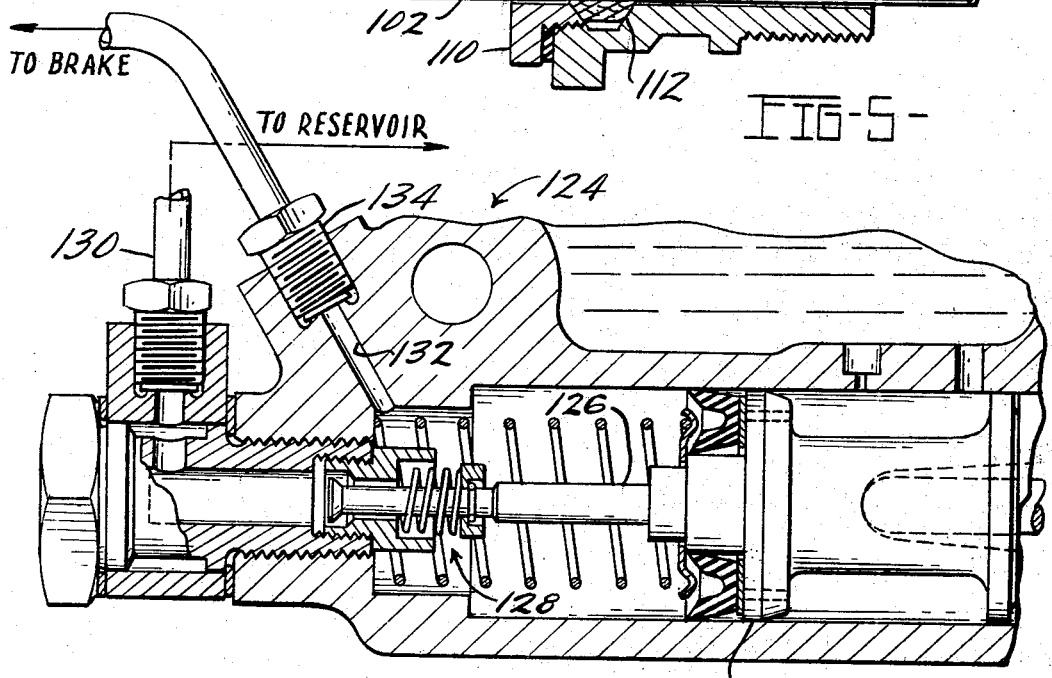

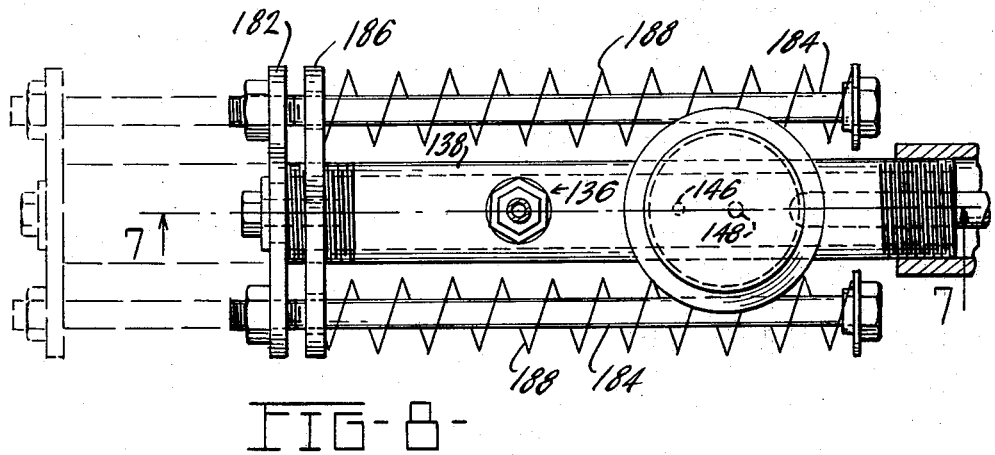
FIG-8-
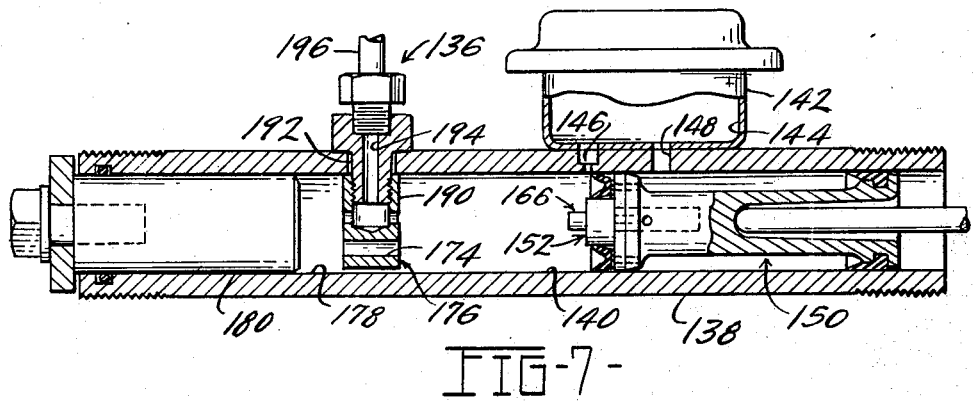
FIG-7-
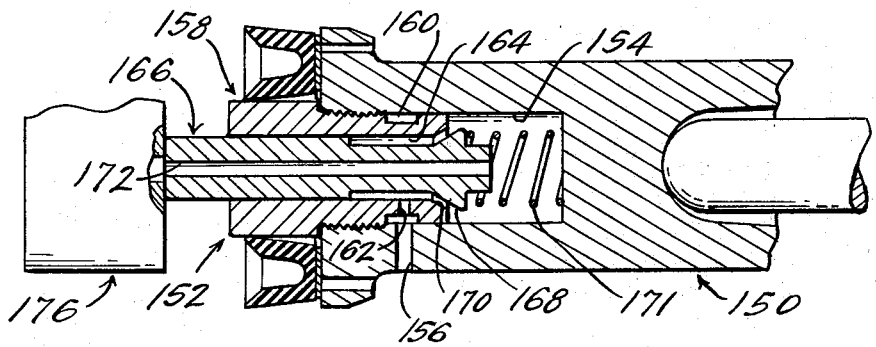
FIG-9-

United States Patent Office 3,505,815
Patented Apr. 14, 1970

3,505,815
TRAILER HITCH WITH TRAILER BRAKE ACTUATOR
Joseph L. Wherry, Perrysburg, Ohio, assignor to Toledo Stamping & Manufacturing Company, Toledo, Ohio, a corporation of Ohio
Filed Feb. 15, 1968, Ser. No. 705,724
Int. Cl. F15b 7/00; B60t 7/20
U.S. Cl. 60—54.5                6 Claims

ABSTRACT OF THE DISCLOSURE

A trailer hitch with a trailer brake actuator has a valve for releasing pressure of the brake fluid for enabling the trailer to be backed up easily. The valve in the master cylinder enables a portion of the brake fluid to flow back to the reservoir of the fluid system when the pressure of the brake fluid is above its normal operating pressure range. The valve can open when the piston of the master cylinder moves into the cylinder a predetermined distance. The valve also can begin to open upon being subjected to a predetermined pressure or an accumulator can be used with the actuator to relieve pressure of the brake fluid to enable the piston to move further into the cylinder. The valve arrangement is relatively simple, reliable in operation, and adds little cost to the hitch and actuator.

---

This invention relates to a trailer hitch incorporating a trailer brake actuator and particularly to such a hitch and actuator having provisions for enabling the trailer to be backed up.

Trailer hitches with trailer brake actuators have two separate components or members movable with respect to one another with one connected to the towing vehicle and the other connected to the trailer. Fluid-operated brakes are employed on the trailer and are actuated through a master cylinder including a piston which is attached to one of the two hitch components. A piston rod engageable with the piston in the master cylinder is moved by the other hitch component to operate the piston and the brakes when the two hitch components move toward one another. A major difficulty is that when attempting to back a trailer with a hitch employing an actuator, the brakes tend to be set immediately, which causes an increase in the force tending to set them, whereby the trailer cannot be backed at all.

Heretofore, various provisions have been incorporated into the trailer brake actuators to avoid setting the brakes as the trailer is backed up, with such provisions including electrically-operated valves, complicated by-pass passages in the hitch, and various mechanical linkages. However, such provisions have met with limited success because of additional costs involved, lack of reliability, high maintenance, or because the back-up device required manual manipulation in order to render the device inoperative prior to backing. Further, some of the devices would continue to render the brakes inoperative when the trailer and towing vehicle were moved forwardly again, unless manually reset, thereby creating a dangerous condition.

In other instances, so-called one-way brakes have been employed with the trailers, which are more effective in stopping the trailer when the trailer is moving forwardly than when moving rearwardly. Consequently, by limiting the maximum fluid pressure, backing can be accomplished against the reduced braking efficiency. With some one-way brakes, mechanical levers are employed to enable backing to occur more freely even when subjected to high fluid pressures, but special brake mechanism is required for each wheel, resulting in high cost.

In accordance with the present invention, a trailer hitch with a trailer brake actuator is provided with a unique valve arrangement which enables a trailer with which the hitch is employed to be backed up easily, without the use of special brakes, and without the necessity of the driver operating any special device, causing not only inconvenience, but a possibly dangerous situation in the event the driver forgets to subsequently render the actuator operative again. Further, the new back-up arrangement is simple, inexpensive, and reliable. It can also be used with existing hitches, actuators, and master cylinders with minimum modifications.

It is, therefore, a principal object of the invention to provide an improved trailer hitch with a brake actuator incorporating a back-up arrangement having the advantages set forth above.

Other objects and advantages of the invention will be apparent from the following detailed description of preferred embodiments thereof, reference being made to the accompanying drawings, in which:

FIG. 1 is a somewhat schematic side view in elevation of a towing vehicle and a trailer employing a trailer hitch embodying the invention;

FIG. 2 is an enlarged view in longitudinal, vertical cross section of the trailer hitch and actuator shown in FIG. 1;

FIG. 3 is a further enlarged view in vertical, longitudinal cross section of a master cylinder employed in the trailer hitch;

FIG. 4 is a still further enlarged, fragmentary view in longitudinal cross section of a piston embodying the invention used in the master cylinder;

FIG. 5 is a view in longitudinal section of a stop located in a rear portion of the master cylinder of FIG. 3;

FIG. 6 is a view similar to FIG. 4 of a modified embodiment of the invention;

FIG. 7 is a view in longitudinal, vertical cross section of another modified brake actuator embodying the invention;

FIG. 8 is a top view of the actuator of FIG. 7; and

FIG. 9 is an enlarged view in longitudinal section of a piston and valve arrangement incorporated in a master cylinder of the actuator of FIGS. 7 and 8.

A trailer hitch embodying the invention indicated at 10 in FIG. 1 is used to connect a towing vehicle 12 with a trailer 14, as is known in the art. As shown in FIG. 2, the hitch 10 includes a forward hitch member or portion 16 having a ball hitch connection 18 to connect with a ball of the towing vehicle, and a rear member or portion 20 having suitable side flanges 22 to connect with a tongue of the trailer 14. The members 16 and 20 are connected for movement toward and away from one another by two sets of parallel links 24 which are pivotally connected at their ends to the hitch members through pivot pins 26 and 28.

A master cylinder 30 embodying the invention is affixed to the rear member 20 by bolts 32 and has a piston or brake rod 34 extending forwardly therefrom. A coil spring 36 is located around a forward portion of the brake rod 34 between a fixed washer or seat 38 and a movable washer or seat 40. The front seat 40 is held against a rear edge of a supporting bracket or plate 42 carried by the front member 16. The spring 36 thereby is compressed between the seats 38 and 40 when the rear member 20 moves forwardly with respect to the forward member 16. The spring 36 then resiliently urges the brake rod 34 toward the master cylinder 30 when the trailer moves closer to the vehicle 12. The forward end of the brake rod is guided by means of a pin 44 extending through a slot 46.

A shock absorber 48 also is connected between the front and rear members 16 and 20 and cooperates with the spring 36 to prevent chucking or surging as sometimes occurs between a trailer and a towing vehicle, particularly during sudden stops or rapid deceleration. Further, the hitch includes a break-away lever 50 which acts directly on the forward end of the brake rod 34 to set the brakes in the event of a break-away.

In the operation of the hitch, the spring 36 limits the maximum force which will be placed on the brake rod 34 and, hence the pressure of the brake fluid, while the shock absorber 48 dampens sudden movement between the hitch members. In a typical operation, the pressure of the brake fluid in the master cylinder will not exceed 1000 p.s.i. under normal operating conditions.

Other details of the specific hitch 10 are discussed in U.S. Patent to DeAngelis et al., No. 3,180,454, and will not be discussed further here, particularly since the specific hitch design is not part of the invention.

With hitches employing actuators, if the towing vehicle 12 attempts to back up the trailer 14, the hitch members 16 and 20 will move toward one another and cause the brake rod 34 to move into the master cylinder 30, thereby setting the brakes of the trailer and preventing backing up. Previously, there have been a number of devices and arrangements devised for enabling a trailer to be backed up when employing a trailer hitch with a brake actuator. Such devices and arrangements, however, have had one or more disadvantages, as discussed above, which have prevented their wide acceptance. Also, while one-way brakes enable backing up, other types of brakes, such as disc brakes, are often considered superior to the one-way brakes and the latter are by no means always used. Consequently, the problem of backing trailers still exists with brake actuators.

In accordance with the invention, a valve is employed in the master cylinder which relieves the brake fluid pressure when it is at a value above the normal operating range so that when the vehicle is backed up and the hitch members 16 and 20 move toward one another and cause the brake rod to force the pressure above such range, the valve will open and the trailer can then be backed up.

Referring particularly to FIG. 3, the master cylinder 30 includes a cast housing 52 forming a master cylinder chamber 54 and a reservoir chamber 56. The housing 52 is of a substantially standard design found in the hydraulic brake systems of automobiles and includes a supply or bleed orifice 58 between the cylinder chamber and the reservoir and a reservoir passage or opening 60 located behind a piston 62 in all positions thereof. The piston 62 has a forward recess 64 which receives an end of the brake rod 34 around which is a suitable bellows seal 66. The piston 62 also has forward annular seal 68 in a groove 70 and an annular piston cup 72 at the rear or operating end of the piston, the annular cup being used in place of the conventional circular one. The piston 62 is urged forwardly in the chamber 54 by a coil spring 74 which seats on a retaining ring 76, with passages 77 (FIG. 4) enabling fluid to flow past the piston during this movement.

In accordance with the invention, a valve, and specifically a pressure-responsive valve 78, is carried by the head of the piston 62 in the center of the annular cup 72. For this purpose, a threaded recess 80 is formed in the piston 62 and communicates with a transverse passage 82 which, in turn, communicates with the reservoir passage 60. A valve body 84 is threadedly received in the recess 80 and has an annular extension 86 against which bears the retaining ring 76. The valve body 84 forms a conical valve seat 88 facing the recess 80. A valve component 90 has a stem 92 and also an annular seat 94 cooperating with the valve seat 88, the stem projecting beyond the extension 86 of the valve body 84. The stem carries a pressure sensitive member or disc 96 by means of a retaining ring 98 against which the member is urged by a biasing spring 100.

The valve 78 will have no effect on the operation of the master cylinder until the pressure in the cylinder chamber 54 exceeds that encountered in the normal operation of the hitch. When the trailer is attempted to be backed up, however, the piston 62 is moved into the cylinder chamber 54, causing the brakes to set, the pressure in the chamber will act upon the end of the valve stem 92 and the pressure member 96, causing the annular seat 94 to move away from the valve seat 88 to thereby open the valve and enable brake fluid in the chamber 54 to be vented through the passage 82 to the reservoir 56. The pressure of the fluid in the chamber 54 will remain above the normal operating range and at a value sufficient to open the valve 78 so that the brakes will remain set until sufficient fluid is vented from the chamber 54 to enable the piston to move to the rear of the cylinder chamber 54, as shown in FIG. 4.

When the piston reaches a predetermined position in the chamber 54, a stop member or rod 102 will engage the valve stem 92 and cause the valve to open, regardless of the pressure in the chamber 54. This will relieve pressure on the brakes and enable the trailer to be backed up without further resistance. Actually, when backing, the piston will reach the stop and open fully to enable backing to take place in less than one second, which time is not noticeable to the driver.

As shown in FIG. 5, the stop member 102 extends through a fitting 104 which is conventional for the master cylinder except being drilled to form a threaded recess 106 and a passage 108 to receive a compression nut 110, a compression ring 112, and the stop member 102. As shown in FIG. 3, the fitting 104 threads into an end opening 114 in the housing 52 and has a cylindrical member 116 therearound which has an opening 118 for receiving a brake line or tube 120 connecting with the brakes. The brake fluid, when under pressure, passes through the opening 108 around the stop member 102 and flows through a transverse hole 122 in the fitting 104 and, hence, through the opening 118 and into the tube 120. As shown, the stop rod 102 can be longitudinally adjusted by loosening the nut 110 and moving the rod longitudinally.

From the above, it will be seen that the embodiment of FIGS. 1–5 is of low-cost construction and employs mostly standard components. Even the body of the piston 62 is conventional as is the end fitting 104 except for the threaded recesses and passages drilled therein. The construction of the valve and the stop member is also simple and embodies inexpensive components. Insofar as the valve is concerned, the only additional components are the valve body 84, the valve member 90, the retaining ring 98, the pressure disc 96, and the small spring 100. Regarding the stop, the only additional components are the stop rod 102, the compression nut 110, and the compression ring 112.

While the relatively low cost of placing the valve in the piston makes this construction preferred, it is also possible for the valve to be carried in the wall of the master cylinder and the stop carried by the head of the piston to achieve similar results from a functional standpoint. Such a construction is shown schematically in FIG. 6. Here, a modified master cylinder includes a substantially conventional brake piston 124, the head of which carries a stop member 126. A valve 128 is mounted in the rear end of the cylinder wall and controls flow of brake fluid back to the reservoir through an external reservoir passage 130. The valve 128 can be substantially similar to the valve 78 of FIG. 4. A rear passage 132 enables the cylinder chamber to communicate with the brake line in this instance through a fitting 134.

Referring to FIGS. 7–9, another embodiment of the invention is shown incorporated in an accumulator type of brake actuator. This actuator is designed to be used with a trailer hitch generally of the type shown in U.S. Patent 3,342,292 to Joseph L. Wherry. A master cylinder 136 of the actuator includes a generally tubular housing 138 forming a cylinder chamber 140 and a separate, stamped housing 142 thereabove forming a reservoir 144. Passages 146 and 148 are located between the reservoir and the chamber. A brake piston 150 can be similar to the piston 62 but is longer since the stroke of the piston 150 is longer and the piston must not uncover the passage 148 when at its extremities. The piston 150 otherwise will not be discussed in detail except for a valve 152 employed in place of the valve 78.

Referring to FIG. 9, the valve 152 is of a balanced design so that the pressure in the chamber 140 does not have any influence on the position of the valve 152. In this instance, a deep recess 154 with a threaded outer end has an intermediate transverse passage 156 which communicates with the reservoir through the passage 148. A valve body 158 in the recess 154 has an annular groove 160 communicating with the passage 156. The body 158 also has a transverse passage 162 communicating with an annular chamber 164 formed between the body 158 and a portion of a valve stem 166. The valve stem 166 forms a valve seat 168 cooperating with a conical valve seat 170 on the body 158 to close off the annular chamber 164 from the end of the recess 154, being normally held closed by a spring 171. The valve stem 166 is of a balanced design with an axial passage 172 extending therethrough whereby pressure in the end of the recess 154 is equal to that in the chamber 140.

With this construction, as the piston moves into the chamber 140 and the pressure therein increases, the valve 152 remains closed. As the pressure in the chamber increases, however, fluid therein flows through a passage 174 of a partition 176 and into an accumulator chamber 178. An accumulator piston 180 in the chamber 178 yields and moves outwardly as pressure and volume in the chamber increase. The piston 180 is resiliently urged into the chamber. For this purpose, a plate 182 is affixed to the outer end of the piston 180 and two outer spring retaining rods 184 are affixed to the plate 182 and extend through a stationary plate 186 suitably near the rear end of the tubular housing 138. A pair of coil springs 188 are located around the rods 184 and are in compression to urge the piston 180 into the chamber 178.

During normal operation of the brake actuator, the accumulator piston 180 moves in and out of the accumulator chamber 178 as the pressure in the cylinder chamber 140 changes. The piston 150 does not move far enough, however, for the valve stem 166 to engage a front face 190 of the partition 176, which face constitutes the stop means in this instance. Consequently, under normal operation, the valve 152 remains closed. However, the springs 188 are designed so that when the pressure in the chamber reaches a sufficient point above the normal operating range, e.g. 1200 p.s.i. for a normal operating range maximum of 1000 p.s.i., the springs will yield sufficiently that the stem 166 will engage the stop surface 190 and open the valve to enable fluid in the end of the recess 154 to pass through the openings 162 and 156 and feed back to the reservoir. Backing can then be effected unimpeded. The brakes in this instance are supplied with the fluid through a fitting 192 in the partition 176 having a passage 194 communicating with a brake line 196.

Various modifications of the above described embodiments of the invention will be apparent to those skilled in the art, and it is to be understood that such modifications can be made without departing from the scope of the invention, if they are within the spirit and the tenor of the accompanying claims.

I claim:

1. Apparatus for actuating brakes comprising wall means forming a master cylinder chamber, a piston movable longitudinally in said chamber, a brake rod engageable with said piston, a fluid reservoir located adjacent said chamber, passage means for connecting a fluid-operated brake and said chamber, a reservoir passage connected directly between said reservoir and a portion of said chamber, said piston having a centrally located recess in a head end thereof, a valve body having a central opening located in said recess, said valve body forming a passage and a valve seat between said recess and said chamber, a valve stem extending through said valve body passage and forming a valve seat cooperating with said valve body seat, resilient means cooperating with said valve stem to cause said seats to be in contact and said valve to be closed under normal operating conditions of said apparatus, an additional passage connected with said valve recess to direct fluid toward said reservoir passage when said valve is open, and stop means extending into said chamber for engaging said valve stem and opening said valve when said piston moves a predetermined distance into said chamber.

2. Apparatus according to claim 1 characterized further by said stop means constituting a stop rod extending into said chamber from a rear portion of said wall means, and means releasably holding said stop rod in place to enable said rod to be adjusted longitudinally.

3. Apparatus according to claim 1 characterized further by pressure-sensitive means carried by said valve stem and adapted to urge said valve stem toward the open position when the pressure in said chamber increases above a generally predetermined level.

4. Apparatus according to claim 1 characterized further by said valve stem having a passage extending centrally therethrough to equalize the pressures in said chamber and in said recess at the ends of said stem, whereby the magnitude of the pressure in said chamber has substantially no effect on the position of said valve stem, and accumulator means to receive a portion of the fluid in said chamber as pressure therein increases.

5. Apparatus according to claim 1 wherein said piston includes an intermediate portion forming an annular chamber with said wall means, said annular chamber communicating with said additional passage and with said reservoir passage.

6. Apparatus for actuating brakes on a towed vehicle and for facilitating backing up of the towed vehicle, said apparatus comprising wall means forming a cylinder chamber, a piston movable longitudinally in said chamber upon relative movement between the towed vehicle and a towing vehicle, a brake rod engageable with said piston, a fluid reservoir, passage means for connecting a fluid-operated brake of the towed vehicle and said chamber, a reservoir passage connected between said reservoir and said chamber, a valve carried by one of said wall means and said piston and positioned between a portion of said chamber and said reservoir passage to control flow of fluid from said chamber through said reservoir passage and to said reservoir when the pressure of fluid in said cylinder chamber is above the normal operating pressure used to operate said brake, said valve including a seat and a stem, means associated with said stem forming a face communicating with said cylinder chamber and effective to open said valve when the pressure in said chamber reaches a predetermined amount above the normal operating pressure, resilient means urging said valve toward the closed position, stop means in said cylinder chamber carried by the other of said wall means and said piston and positioned to force open said valve against the force of said resilient means when said piston moves a predetermined distance into said cylinder chamber.

References Cited

UNITED STATES PATENTS

| | | | |
|---|---|---|---|
| 2,190,238 | 2/1940 | Lepersonne | 60—54.6 |
| 2,698,069 | 12/1954 | Henry | 188—112 |
| 2,993,568 | 7/1961 | Henry | 188—112 |
| 2,345,165 | 3/1944 | White | 60—54.6 XR |
| 2,746,574 | 5/1956 | Smith et al. | 188—112 |
| 3,228,195 | 1/1966 | Brent et al. | 60—54.6 |

FOREIGN PATENTS 836,924  6/1960  Great Britain.

MARTIN P. SCHWADRON, Primary Examiner
R. R. BUNEVICH, Assistant Examiner

U.S. Cl. X.R.

188—112